United States Patent [19]
Arbon

[11] 3,823,740
[45] July 16, 1974

[54] VALVE DEVICE FOR REGULATING MIXTURE AND FLOW OF LIQUID TO A DISCHARGE OUTLET FROM TWO SEPARATE INLETS

[75] Inventor: Dennis Charles Arbon, Cheltenham, England

[73] Assignee: Walker Crosweller & Company Limited, Cheltenham, England

[22] Filed: Mar. 29, 1972

[21] Appl. No.: 239,054

[30] Foreign Application Priority Data
Mar. 30, 1971  Great Britain ..................... 8734/71

[52] U.S. Cl. ......................................... 137/625.17
[51] Int. Cl. ............................................ F16k 11/02
[58] Field of Search ............................. 137/625.17

[56] References Cited
UNITED STATES PATENTS

| | | | |
|---|---|---|---|
| 2,870,790 | 1/1959 | Jordan | 137/625.17 X |
| 3,123,100 | 3/1964 | Burnett | 137/625.17 |
| 3,146,795 | 9/1964 | Retallick | 137/625.17 |
| 3,166,097 | 1/1965 | Hinderer et al. | 137/625.17 |
| 3,272,216 | 9/1966 | Lake | 137/625.17 X |
| 3,542,066 | 11/1970 | Cordova | 137/625.17 X |

Primary Examiner—William R. Cline
Attorney, Agent, or Firm—Kemon, Palmer & Estabrook

[57] ABSTRACT

A valve for mixing and controlling the flow of fluid from two different sources, e.g. hot and cold water, the valve including a liner having a port leading to a mixing and discharge chamber and a piston received within the liner for both reciprocating and rotating controlled movement, the piston including two ventricles each for receiving fluid from one source and each ventricle having a port which on controlled piston movement may be brought into register with the liner port to vary both the flow rate by reciprocating movement and to vary the mixture by rotating movement.

9 Claims, 8 Drawing Figures

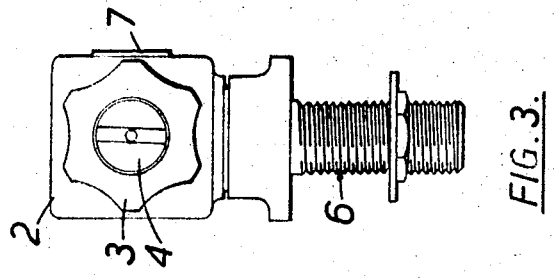
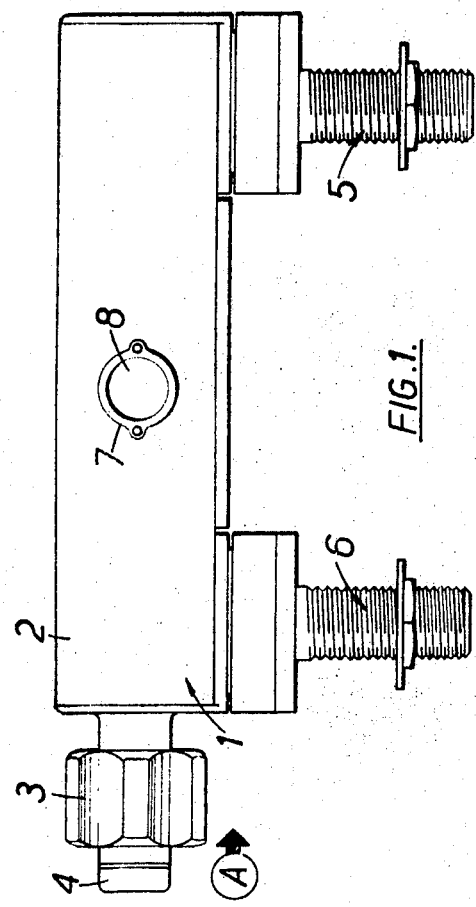
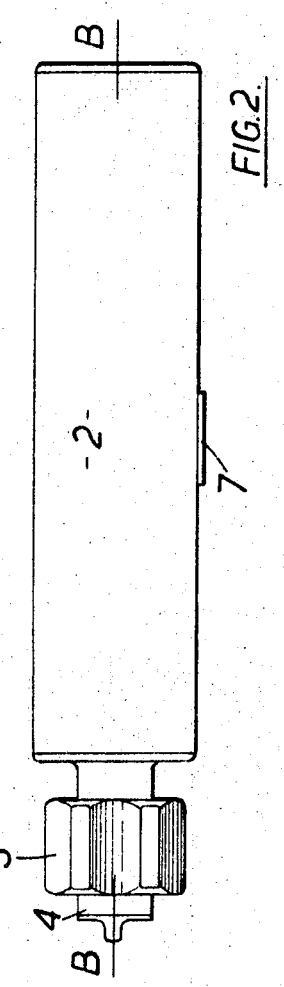

VALVE DEVICE FOR REGULATING MIXTURE AND FLOW OF LIQUID TO A DISCHARGE OUTLET FROM TWO SEPARATE INLETS

SPECIFIC DESCRIPTION

This invention relates to valves for mixing fluids from two different sources, such as hot and cold water, of the kind adapted to be adjusted manually so as to vary either the flow rate of the fluid mixture discharged from the valve, and/or the relative proportions in the fluid mixture.

The principal object of the invention is to provide a fluid mixing valve which is economical to manufacture and is sensitive in operation so that it is capable of adjusting the discharge rate to fine limits from zero to a maximum and of adjusting the relative proportions of fluids in the mixture, also to fine limits, throughout the entire range of discharge.

Further objects of the invention are to facilitate the assembly of the valve from its component parts and the installation of the assembled valve in an existing fluid supply system, to minimise the noise created by fluid flowing through the valve and the tendency for any of the relatively movable component parts to obstruct or resist movement of any other of the said parts, and to enhance the aesthetic external appearance of the valve.

According to this invention we provide a fluid mixing valve comprising a body defining first and second axially spaced fluid inlet chambers respectively for connection to first and second fluid supplies, a liner mounted in the body intermediate the first and second fluid inlet chambers, a mixing chamber extending between the body and the liner, a discharge outlet in the body and a port in the liner each respectively communicating with the mixing chamber, a piston mounted within the liner for axial and rotating movement relative to the liner, control means connected to the piston for reciprocating and rotating the piston between extreme positions, first and second fluid paths respectively extending into the liner and the piston from the first and second inlet chambers, and means closing both said paths when the piston is in a first extreme axial position, the piston having first and second ventricles arranged respectively for communication with the first and second fluid paths when the piston is reciprocated from said first extreme axial position and the piston further having first and second ports respectively associated with said first and second ventricles, the arrangement being such that when the piston is in said first extreme axial position there is no flow of fluid through the piston ventricles to the mixing chamber and thus to the discharge outlet, when the piston is reciprocated away from said first extreme axial position towards a second extreme axial position the first piston is brought progressively into register with the liner port to permit progressively increasing flow of fluid to the mixing chamber for the discharge outlet from the first inlet chamber through the first fluid path into the first ventricle, and when the piston is rotated, said second piston port is brought progressively into register with the liner port to permit flow of fluid from said second inlet chamber to the mixing chamber for the discharge outlet at a flow rate dependent on the axial position of said piston whereby the rotation and reciprocation of the piston by the control means adjusts the degree of mixing and the flow rate.

Preferably, the first and second piston ports are disposed on opposed sides of the piston axis. Additionally, the liner port comprises an array of perforations extending circumferentially around the liner wall to an extent of about 180°.

Conveniently, the piston is mounted on a spindle extending axially of the valve body and control means mounted on the spindle is arranged to both rotate and axially displace the spindle.

In a preferred construction the valve body comprises a tubular centre section in which the liner is disposed with the body also including first and second inlet elbows defining said first and second inlet chambers, said first and second inlet elbows being retained in situ by the liner.

In order that this invention be fully understood, especially in respect of certain other preferred features, an exemplary embodiment of this invention will now be described with reference to the accompanying drawings wherein:

FIG. 1 is a front elevation of a mixing valve for hot and cold water;

FIG. 2 is a top plan view of the valve of FIG. 1;

FIG. 3 is an end view of the valve taken in the direction of arrow A of FIG. 1;

Figure 4:
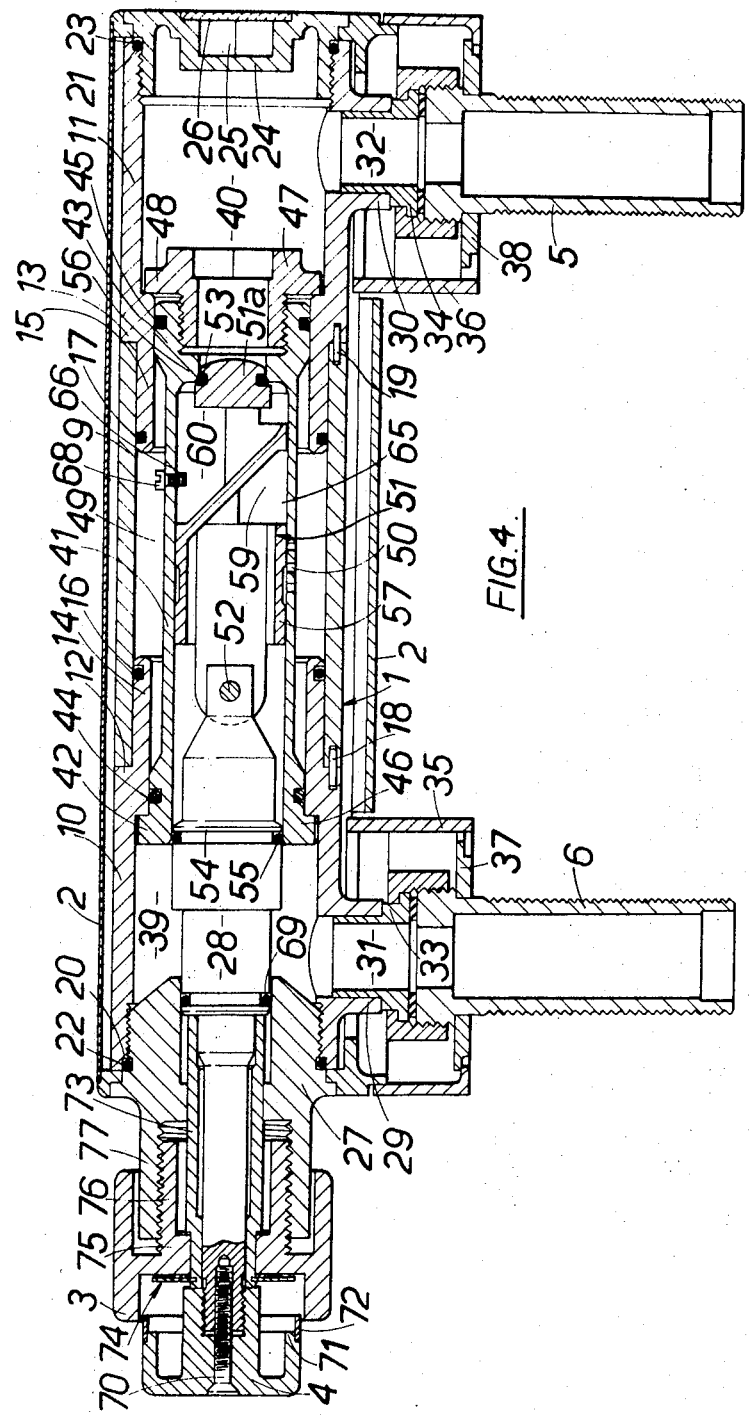
FIG. 4 is a section on line B—B of FIG. 2.
Figure 5:
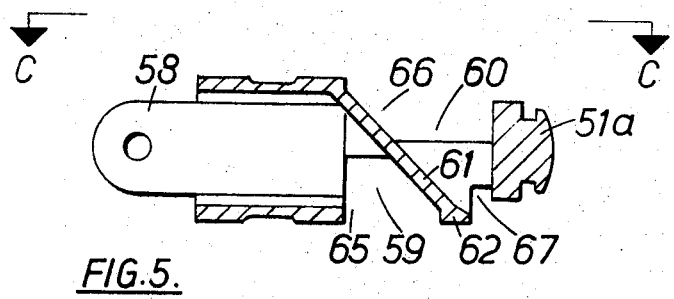
FIG. 5 is an enlarged sectional view of the detail of the piston depicted in FIG. 4.
Figure 6:
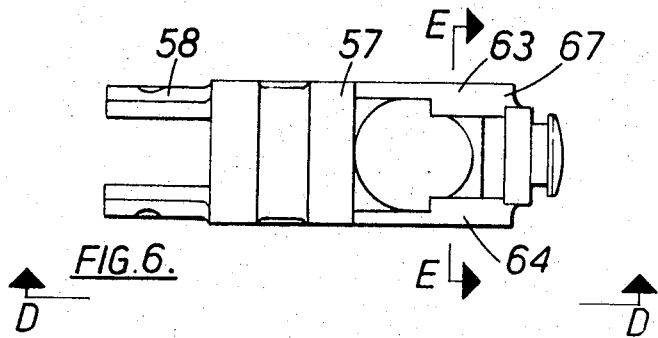
FIG. 6 is a view on line C—C of FIG. 5.
Figure 7:
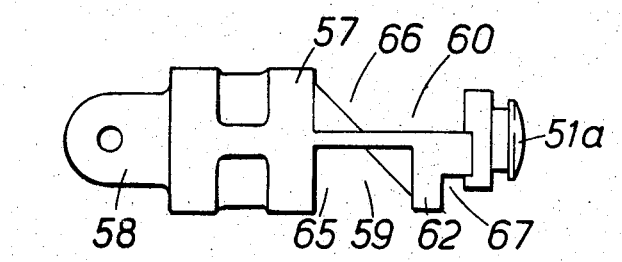
FIG. 7 is a view on line D—D of FIG. 6.
Figure 8:
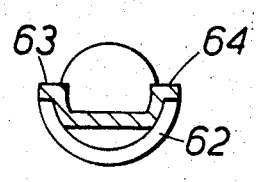
FIG. 8 is a sectional view on line E—E of FIG. 6.

As will be seen from the general views of FIGS. 1, 2 and 3 of the accompanying drawings, a valve body 1 is enclosed in a shroud or trim 2 and one end of the body carries a rotatable flow control knob 3 and a rotatable mixture control knob 4. Additionally, water supply pipe connections 5, 6 (respectively) extend from either end of the valve body in a common plane, and a boss 7 including a discharge outlet 8 extends from the valve body through the trim in a direction normal to the aforementioned plane. In this exemplary embodiment it is assumed that hot water will be supplied through supply pipe 5, and cold water will be supplied through supply pipe 6, however this arrangement may be reversed. The attitude of the supply pipe connections 5, 6 relative to the discharge outlet may be varied to suit wall or bath mounting installations. In practice a discharge spout or diverter valve and spout assembly will be connected to the boss 7 and in communication with the discharge outlet 8. As will be appreciated the trim 2 is merely to improve the aesthetic appearance of the valve and may be of any suitable shape or configuration and of any suitable material. Alternatively, the trim could be omitted and the valve body could be made of a plastics material or metal with an integral finish.

With reference also to FIG. 4, the valve body 1 comprises a tubular centre section 9 of substantially cylindrical shape except for the provision of the discharge outlet boss 8 as aforementioned.

One of the similar inlet elbows 10, 11 is associated with each end of the centre section 9. Each inlet elbow 10, 11 has a tubular and substantially cylindrical body of the same external diameter as the centre section 9. One end of each body 10, 11 has a step 12, 13 from which extends a spigot portion 14, 15 received within the associated end of the centre section 9. O-rings 16, 17 are seated in a respective circumferential groove formed in each spigot portion 14, 15 adjacent the free ends thereof, and these O-rings 16, 17 provide a fluid-tight seal between the centre section 9 and their associated inlet elbow 10, 11. Each inlet elbow 10, 11 is located axially of the centre section 9 by the engagement of the opposed end faces of the centre section 9 with the respective outer faces of the inlet elbow steps 12, 13. Each inlet elbow 10, 11 is located against turning movement relative to the centre section 9 by a pin 18, 19 (respectively) received in respective bores formed in the associated elbow step 12, 13 and the associated end portion of the centre section 9. It should be noted that additional bores may be provided at circumferentially spaced positions on either the inlet elbow or the centre section to enable their relative attitudes to be varied.

Each inlet elbow 10, 11 is open at the end opposed to the spigot portion 14, 15. The internal wall of each elbow body at each opposed end is provided with a peripheral rebate 20, 21 (respectively) adjacent the end face in which an O-ring 22, 23 (respectively) is seated and a female thread extends from each rebate 20, 21 towards the respective spigot portion 14, 15.

The open end of the one inlet elbow body 11 receives a threaded end cap 24 which closes the end in a fluid-tight manner. The end cap 24 may be of any suitable material, e.g. metal or plastic or a combination of same, and it includes a socket 25 for rotating it relative to the elbow body, and the mouth of the socket is spanned by a closure plate 26.

The open end of the other inlet elbow 10 receives a threaded head nut 27 having an axial bore through which a reciprocable and rotatable spindle 28 extends.

Furthermore, each inlet elbow 10, 11 includes a boss 29, 30 (respectively) extending from the wall of the body and each boss 29, 30 has a through bore defining an inlet passage 31, 32. In the conventional manner, a bush 33, 34 is secured in each boss 29, 30 and is coupled to the respective supply pipe 6, 5. Each boss and coupling assembly is enclosed respectively by an escutcheon 35, 36 and retainer 37, 38.

Accordingly, the interiors of the two inlet elbows 10, 11 define two axially opposed inlet chambers 39, 40 for receiving respectively cold and hot water.

A tubular liner 41 is received within the centre section 9 and extends axially between the two inlet elbows 10, 11. Each end of the liner 41 is formed with a thickened end portion 42, 43 including a circumferential groove respectively seating an O-ring 44, 45 for ensuring a fluid-tight seal between the internal face of the respective spigot 14, 15 and the liner 41. One extreme end of the liner includes a flange 46 which engages with the internal face of the inlet elbow step 12 to locate the liner 41 axially of the inlet elbow 10 and centre section 9. The other extreme end of the liner 41 is formed with a threaded bore in which a threaded spigot of a liner retaining cap 47 is received. The liner cap 47 has a through bore and a flange 48 which engages with the internal face of the inlet elbow step 13. Such engagement locates the liner 41 axially of the inlet elbow 11 and the centre section 9 serves to retain both the liner 41 and the whole assembly together. As will be appreciated, the liner 41 may be disposed either as shown in FIG. 4 or in the reverse position.

An annular space between the liner 41 and the centre section 9 defines a mixing chamber 49 which is in communication with the discharge outlet 8 in the centre section 9 and which may communicate with the interior of the liner 41 through a port 50 formed in the liner wall. The port 50 in the liner wall comprises an array of perforations which extend circumferentially around the liner wall for not more than 180°. The perforations also extend axially of the liner 41 to an extent not greater than the axial length of ports provided in a piston or valve member 51 (to be described later) received in the liner 41.

The liner 41 has a cylindrical bore of constant diameter except for the end in which the retaining cap 47 is received. The piston 51 is received within the bore and is pivotally carried on the end of the spindle 28 by a gudgeon pin 52 which enables a degree of axial misalignment to be accommodated. The crown 51a of the piston carries an O-ring 53 and the spindle 28 has an annular shoulder 54 also carrying an O-ring 55, both of these O-rings 53, 55 are arranged to effect fluidtight seals between the liner 41 and the respective opposed inlet chambers 40, 39 when the mixing valve is in the "off" position as depicted in FIG. 4 with the spindle 28 being entered into the liner bore to the position limited by the abutment of the piston crown 51a with an inwardly directed rib 56 of the liner 41.

With reference also to the detail views of FIGS. 5, 6, 7 and 8, the piston 51 comprises an annular skirt portion 57 of which the outer periphery is relieved to minimise friction between the piston and the liner bore. A pair of lugs 58 extend axially from the skirt portion 57 and these lugs are bored and receive the gudgeon pin 52. A head section extending between the skirt portion and the crown is divided into two ventricles 59, 60 by an internal dividing wall 61 extending approximately at 45° to the axis of the piston.

The dividing wall 61 extends from one side of the piston skirt 57 to a part-circular seating 62 including an opening 67 extending adjacent the piston crown 51a, and a pair of diametrically opposed axial webs 63, 64 extend from the seating 62 to the skirt 57.

Each of the ventricles 59, 60, is open to the exterior of the piston through respective peripheral ports 65, 66 and is arranged to receive fluid from the respective one of the inlet chambers 39, 40 when the piston 51 is displaced axially by the spindle 28 so that the O-rings 55 and 53 are released from sealing engagement with the liner 41, for instance on movement from left to right in FIG. 4. With reference to the left-hand ventricle 59, a fluid communication or passageway extends through the skirt 57 and around the spindle flange 54 into the inlet chamber 39; and with reference to the right-hand ventricle 60, a fluid communication or passageway extends through the opening 67, around the crown 51a of the piston, past the rib 56 and through the bore of the liner retaining cap 47 into the inlet chamber 40.

The liner port 50 is disposed substantially at a midposition intermediate the ends of the liner 41 so that when the valve is in said "off" position, the liner port 50 is not in register with either of the ports 65, 66 of the piston 51 and there is no flow to the mixing chamber 49. The axial position of the port 50 is such that it is not opened until the O-rings 55 and 53 are released from their sealing engagement.

The piston 51 is also rotatable by means of the spindle 28 between two extreme positions spaced approximately 180° apart defined by a stop pin 68 located in the liner 41 which is engageable with either one of the axially extending webs 63, 64 of the piston 51.

The spindle 28 for rotating and reciprocating the piston 51 relative to the liner 41 extends through the bore of the head nut 27 which is enlarged at its inward end for an axial length corresponding at least to the required reciprocal stroke of the piston 51. Inbetween a shoulder and a flange the spindle 28 carries an O-ring 69 engaging with such enlarged bore portion to ensure a fluid-tight seal between the spindle 28 and the head nut bore.

The rotation of the spindle 28 is effected through the mixture control knob 4 mounted on the extreme end of the spindle 28 by a screw 70. The knob 4 comprises a plurality of inwardly directed circumferentially spaced limbs 71 having a peripheral groove on which is removably seated a collar 72 carrying visual indications by which the user is informed of the required direction of rotation for obtaining hot and/or cold water.

The reciprocation of the spindle 28 is effected through the flow control knob 3 which is located on a sleeve 73 surrounding the end portion of the spindle by a circlip 74. The sleeve 73 is of hexagonal configuration in section, and extends through a complementary bore in the head nut 27 so that relative reciprocation but not relative rotation may occur. The inner end of the sleeve 73 abuts against the spindle flange, and a shoulder near the outer end of the sleeve 73 abuts against a radial inward face of a centre boss 75 of the flow control knob 3. The outer end of the sleeve 73 is of circular configuration in section and is received within the bored centre boss 75 of the flow control knob so that the control knob 3 may freely rotate relative to the spindle and not impart any turning forces. The flow control knob 3 has a cylindrical tubular spigot 76 extending from the centre boss 75, and the spigot 76 has a male screw thread engaging with a female screw thread provided on the inside face of a sleeve-like extension 77 on the head nut 27. The flow control knob 3 includes an axial finger-grip portion which neatly covers the connections between the mixture control knob 4, the sleeve 73 and the spindle 28.

As will be appreciated from the foregoing description of the head nut and associated assembly, when the flow control knob 3 is rotated, the interengagement of the threads on the head nut 27 and the knob 3 causes the knob 3 to be axially displaced as to withdraw or enter the spindle 28 and piston 51 relative to the liner 41. The limit of entering movement is defined by the abutment of the piston crown 51a with the liner rib 56, and the limit of withdrawal is defined by the abutment of the engagement of the spindle flange with the head nut shoulder.

Conveniently, the mixture and flow control knobs as well as the head nut may be made from a plastics material, but they may be made from metal.

As aforementioned the accompanying drawings depict the mixing valve in the "off" position, and the spindle 28 is in a rotated position controlled by the mixture control knob 4 such that the piston port 65 for communication with the left-hand inlet chamber 39 which is arranged to receive cold water, is in axial alignment with the liner port 50. The other piston port 66 is not axially aligned with the liner port 50.

On rotation of the flow control knob 3, the spindle 28 is withdrawn axially so that the piston 51 is moved from left to right to bring the piston port 65 into register with the perforations of the liner port 50. On the initial axial movement of the piston 51 the passageways from both the inlet chambers 39, 40 are opened and thus cold water from the left-hand inlet chamber 39 may flow into the left-hand ventricle 59 of the piston 51. Depending on the number of perforations in register with the piston port 65, flow of cold water can occur through those registered perforations into the mixing chamber 49 and thus to the discharge outlet 8. However, although the right-hand inlet chamber 40 for hot water is in communication with the right-hand ventricle 60 of the piston 51, no hot water may flow as the piston port 66 is not in registration with any of the perforations of the liner port 50.

As will now be understood, as the flow control knob 3 is further rotated, so the piston 51 is moved further axially to an extreme position limited by the maximum amount of withdrawal of the spindle as aforedescribed. At this extreme position, the maximum number of perforations of the liner port 50 are in register with the piston port 65 so that the discharge flow is at a maximum.

If it is now assumed that the mixture control knob 4 is rotated, then the other piston port 66 is rotated into register with the liner port 50 so that hot water may also flow from the right-hand ventricle 60 through those perforations of the liner port brought into register with said other piston port 66 into the mixing chamber 49. Accordingly, depending on the ratio of perforations in register respectively with the two piston ports 65, 66, the proportions of the hot and cold water flowing into the mixing chamber 49 may be varied by rotating the mixture control knob 4.

As will also be understood, by rotating the mixture control knob to its other extreme position, approximately turning the piston through 180°, only the piston port 66 of the right-hand ventricle will be axially aligned with the liner port 50 and thus only hot water may flow, the cold water flow being discontinued because the piston port 65 of the left-hand ventricle 59 is effectively closed.

The flow rate of the discharged water may be varied at will by rotating the flow control knob 3 irrespective of any selected position of the mixture control knob 4.

In the construction of the foregoing exemplary embodiment there are certain features which are of particular advangeous importance.

The mixing valve is comprised of basic components which are interchangeable so that they can be assembled to provide a right or left handed mixing valve. Even the collar 72 can be changed to reverse the visual indications. The use of such basic components reduces both manufacturing and installation costs whilst simplifying stock-holding as opposite handed versions do not have to be retained. Additionally, by varying the attitude of the inlet elbows relative to the centre body, different mounting or installation requirements can be met. However, the valve body could be provided with integral inlet elbows at each end if desired. If desired, the pipe connections to the water supply pipes may be modified to provide dog-leg unions which permits the mixing valve to be connected to a range of existing water supply pipes having different centres.

Another important feature is the construction of the piston which is such as to provide a balanced flow. It will be appreciated that the wall dividing the two ventricles extends at approximately 45° to the axis of reciprocating movement of the piston. Accordingly, the opposed forces of the hydraulic pressure exerted on the opposed sides of the dividing wall are resolved by opposed radial reactions which will not cause imbalance tending to move the piston axially. Additionally, the inclination of the dividing wall promotes smoother flow of the water through the appropriate ventricle towards the appropriate port.

The liner port comprises an array of perforations which serve to silence the flow of water and to minimise any tendency for the port to obstruct or restrict reciprocation of the piston. However this arrangement is not essential as an axially extending part-circumferential opening could be utilised.

With reference to the arrangement of the ports this could be modified if desired to achieve a similar result. For instance, if the circumferential length of the piston ports is reduced to provide lands separating the piston ports an alternative arrangement of the liner port can be employed. In fact, two independent circumferentially offset liner ports could be employed. Alternatively, the piston ports could be axially spaced, and two axially spaced liner ports each for registration with one of the piston ports would be provided. However these feasible alternatives detract from the simplicity of the preferred construction aforedescribed and reduce the advantages achieved thereby.

I claim:

1. A valve device for regulating mixture and flow of liquid to a discharge outlet from first and second inlets said device comprising a body having a first inlet chamber, a second inlet chamber axially spaced from said first inlet chamber, a liner mounted within said body intermediate said first and second inlet chambers, a mixing chamber extending between said liner and said body and communicating with the discharge outlet, a port in said liner opening to said mixing chamber, a valve member for co-operation with said liner port and mounted within said liner for relative axial and rotating movement, a partition within said valve member dividing the interior of said valve member into first and second axially opposed ventricles for communication each respectively with the adjacent one of said inlet chambers, said ventricles having outlet ports, control means connected to said valve member for reciprocating and rotating said valve member relative to said liner to vary the position of said outlet ports of said first and second ventricles relative to said liner port to regulate mixture and flow therethrough to said discharge outlet, and sealing means for closing said inlet chambers on reciprocation of said valve member to an extreme position to stop flow from said inlet chambers to said first and second ventricles.

2. A valve device according to claim 1 wherein said outlet ports of said valve member are circumferentially spaced apart.

3. A valve device according to claim 2 wherein said liner port comprises a regular series of perforations through the wall of said liner.

4. A valve device according to claim 3 wherein said partition wall of said valve member extends substantially at 45° to the axis of reciprocation thereof.

5. A valve device according to claim 1 wherein said body has a substantially cylindrical centre section having first and second inlet elbows connected each at one end defining said first and second inlet chambers, said liner being mounted in said centre section with one end having a flange engaging said first inlet elbow and the other end engaging a retaining cap associated with said second inlet elbow.

6. A valve device according to claim 5 wherein said control means comprises a head nut seated in said first inlet elbow, a rotatable and reciprocable spindle connected to said valve member and extending through said head nut.

7. A valve device according to claim 6 wherein said control means further comprises a flow control knob on said spindle located against relative axial movement and engaging a thread on said head nut, and a mixture control knob secured to said spindle for rotating said spindle.

8. A valve device according to claim 7 wherein said valve member is pivotally connected to said spindle and said valve member has a head remote from said spindle connection, said head carrying a seal for engagement with a seating of said liner for closing said adjacent inlet chamber.

9. A valve device according to claim 8 wherein said spindle carries a seal for engagement with said liner for closing said communication from said adjacent inlet chamber to the adjacent said ventricle.

* * * * *